July 23, 1935.　　　G. P. PIGANEAU　　　2,009,275
SERVO BRAKE
Filed Aug. 3, 1933　　　7 Sheets-Sheet 1
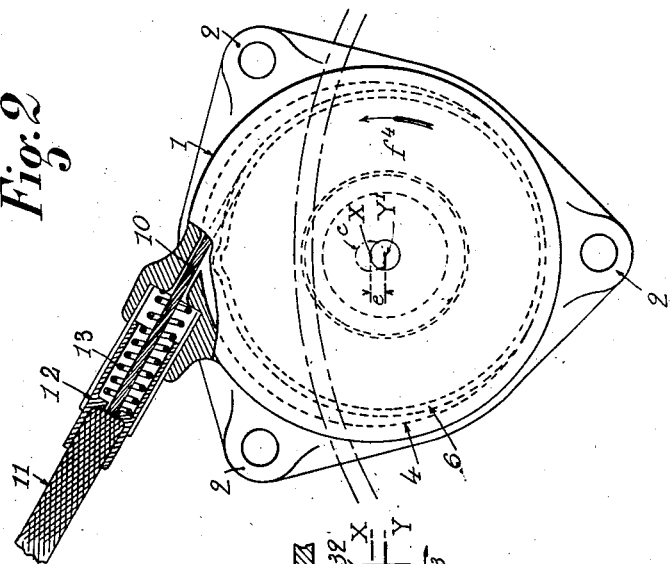
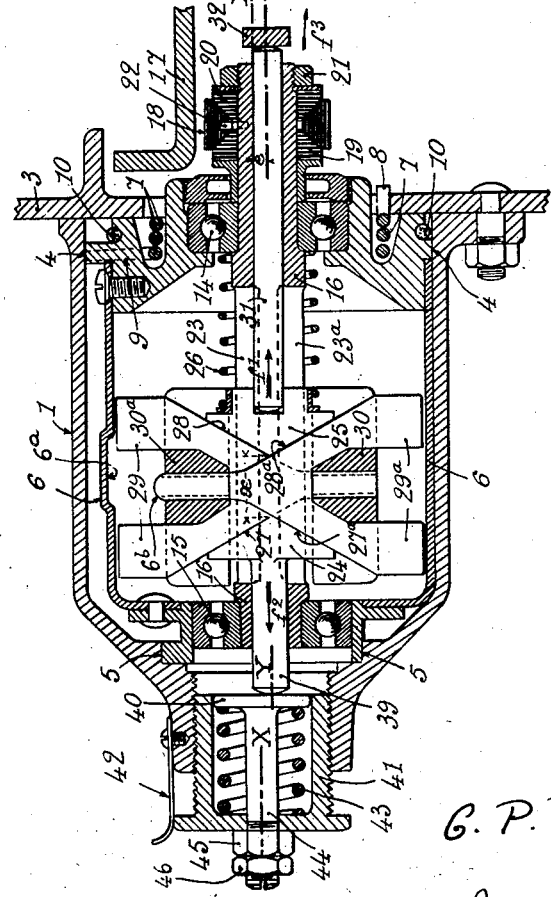
G. P. Piganeau
INVENTOR
By Marks & Clerk
Attys.

July 23, 1935.  G. P. PIGANEAU  2,009,275
SERVO BRAKE
Filed Aug. 3, 1933  7 Sheets-Sheet 2
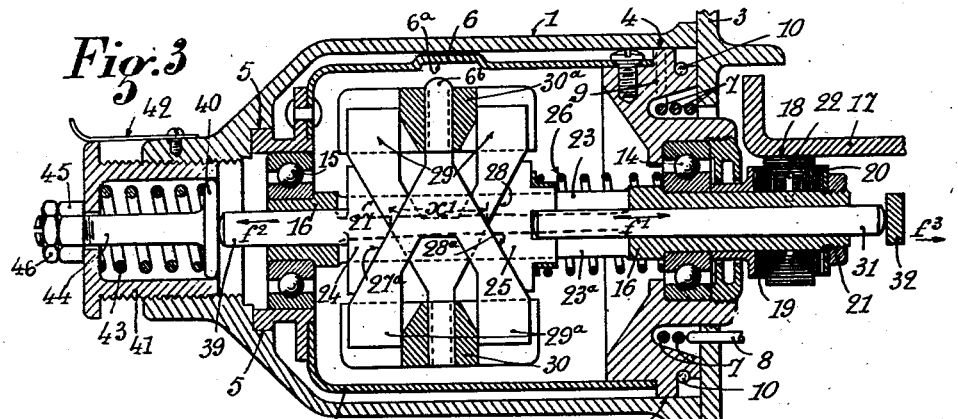
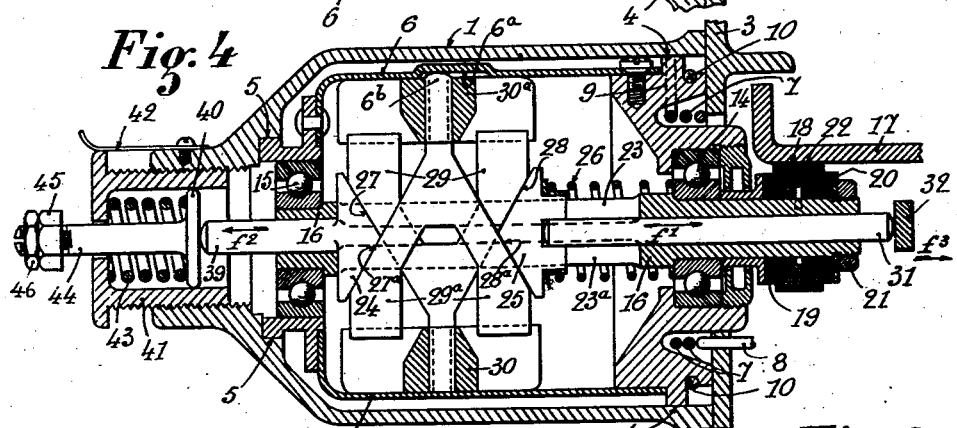
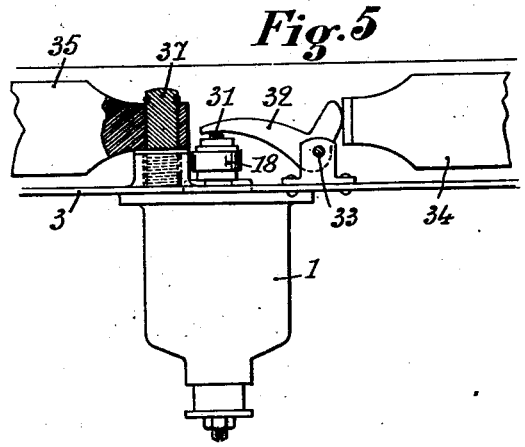
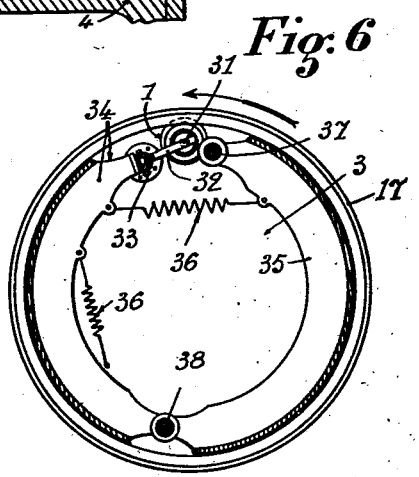
G. P. Piganeau
INVENTOR
By: Marks & Clark
ATTYS.

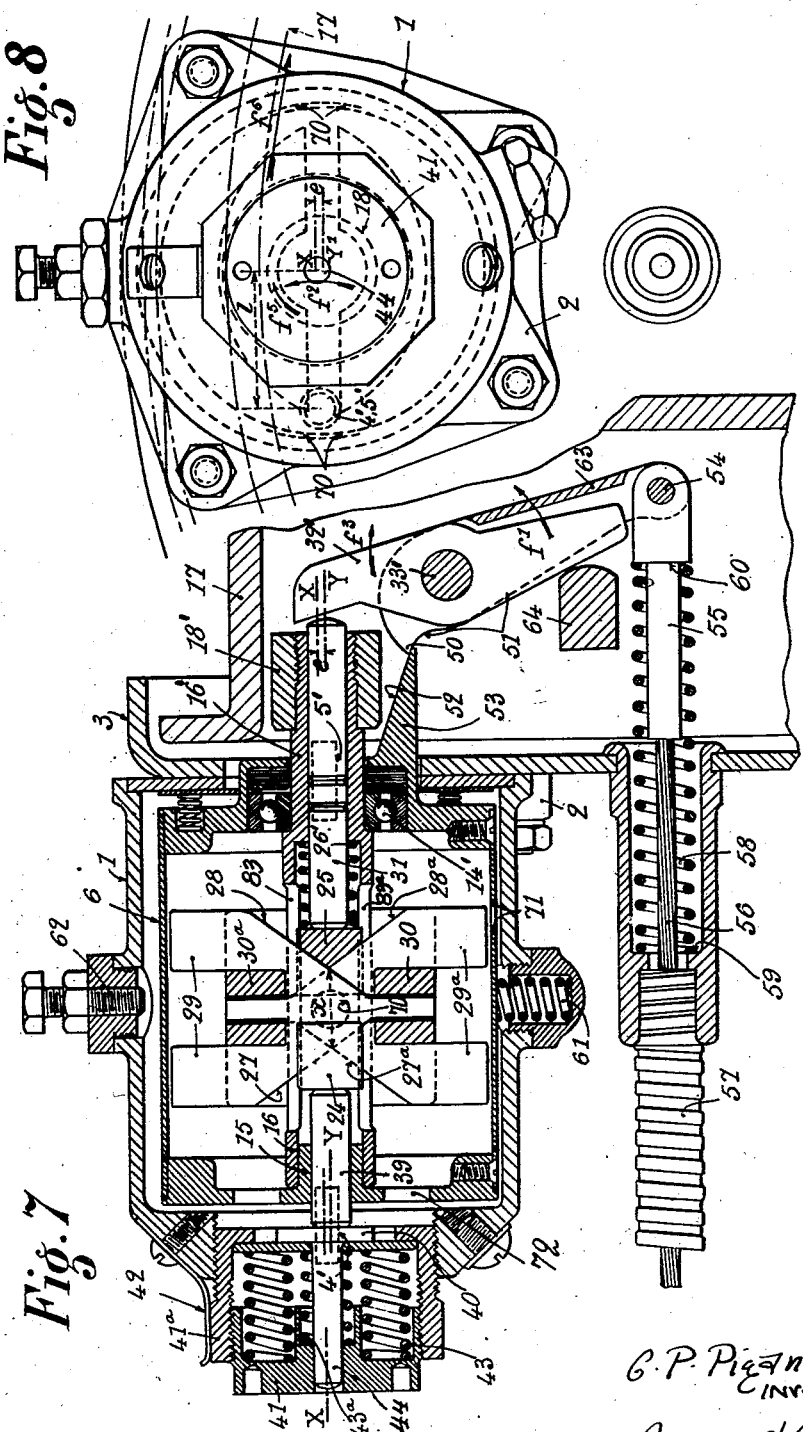

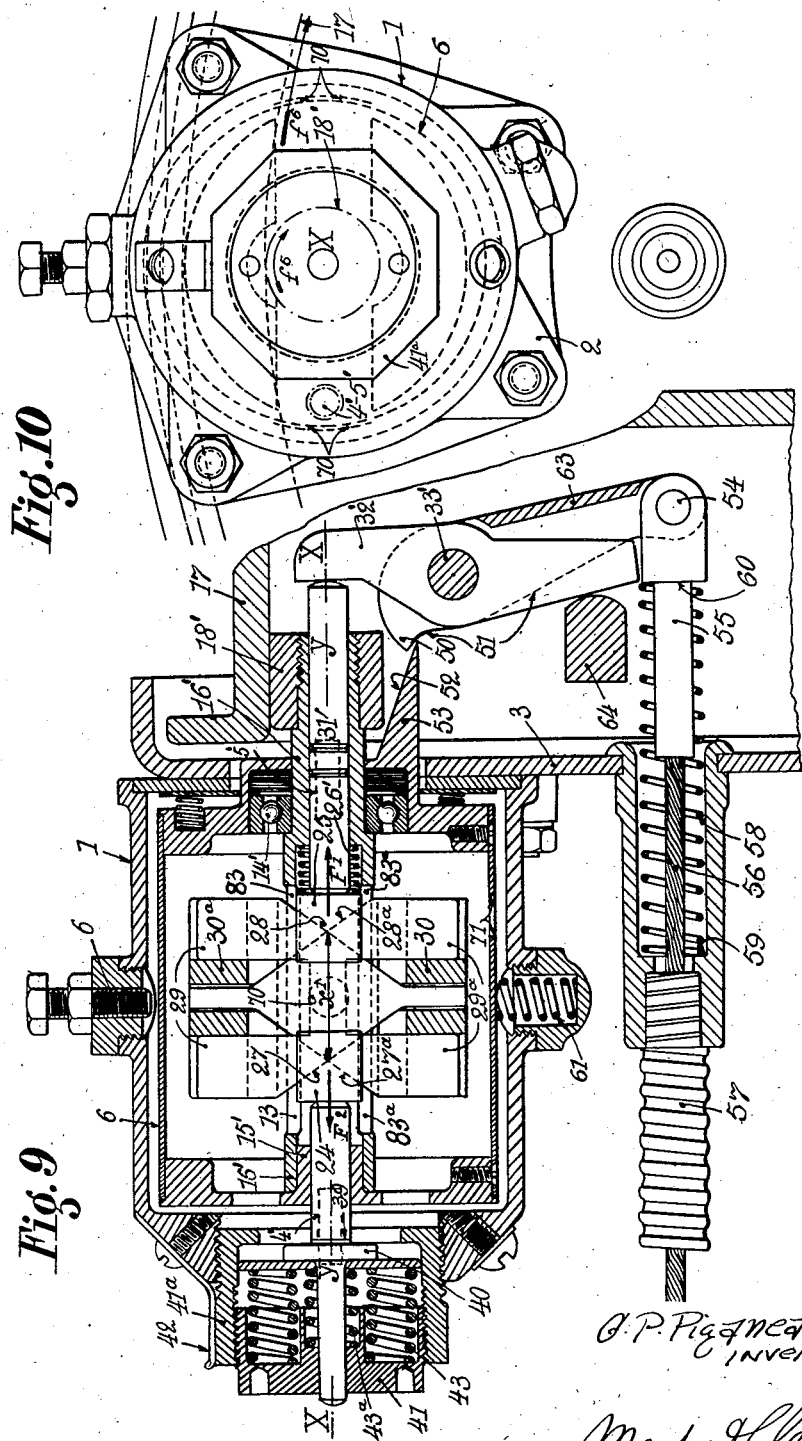

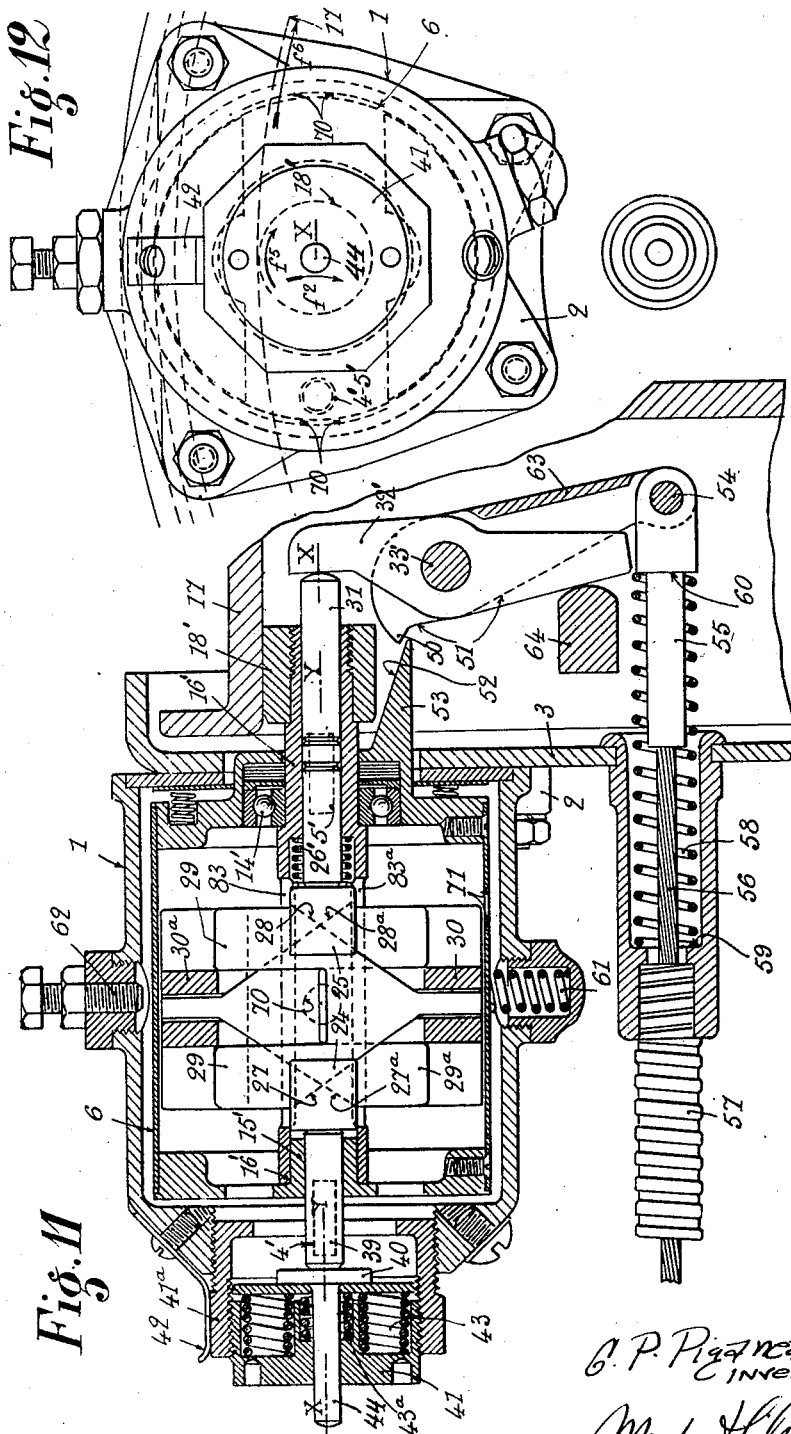

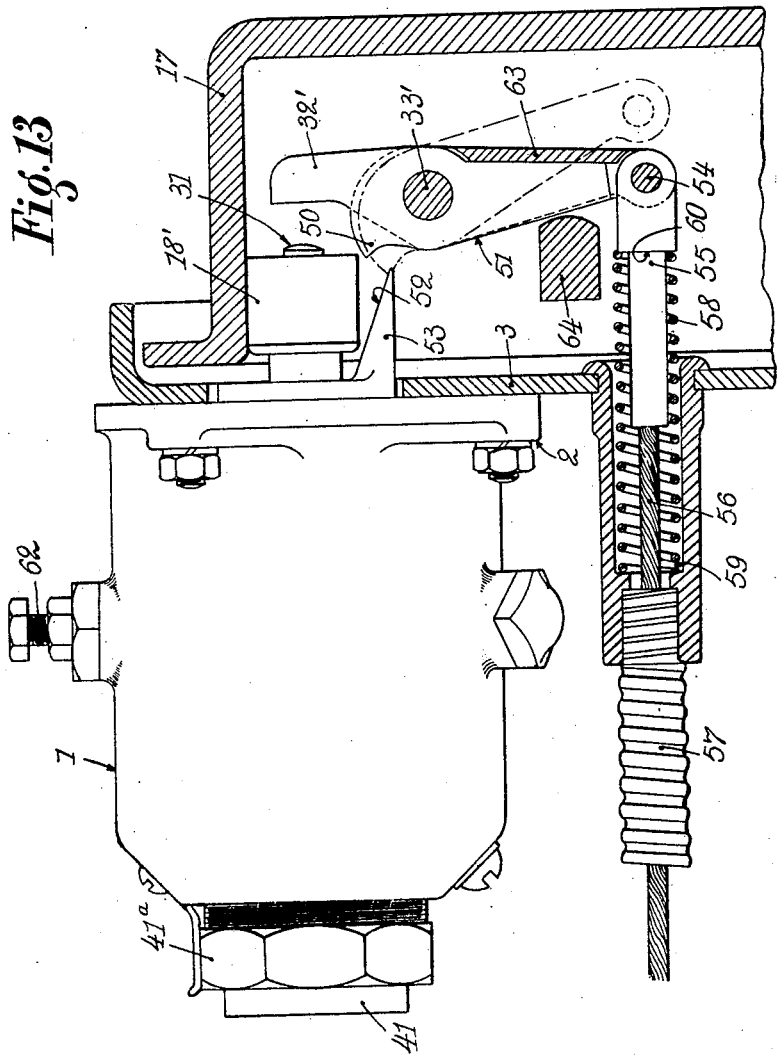

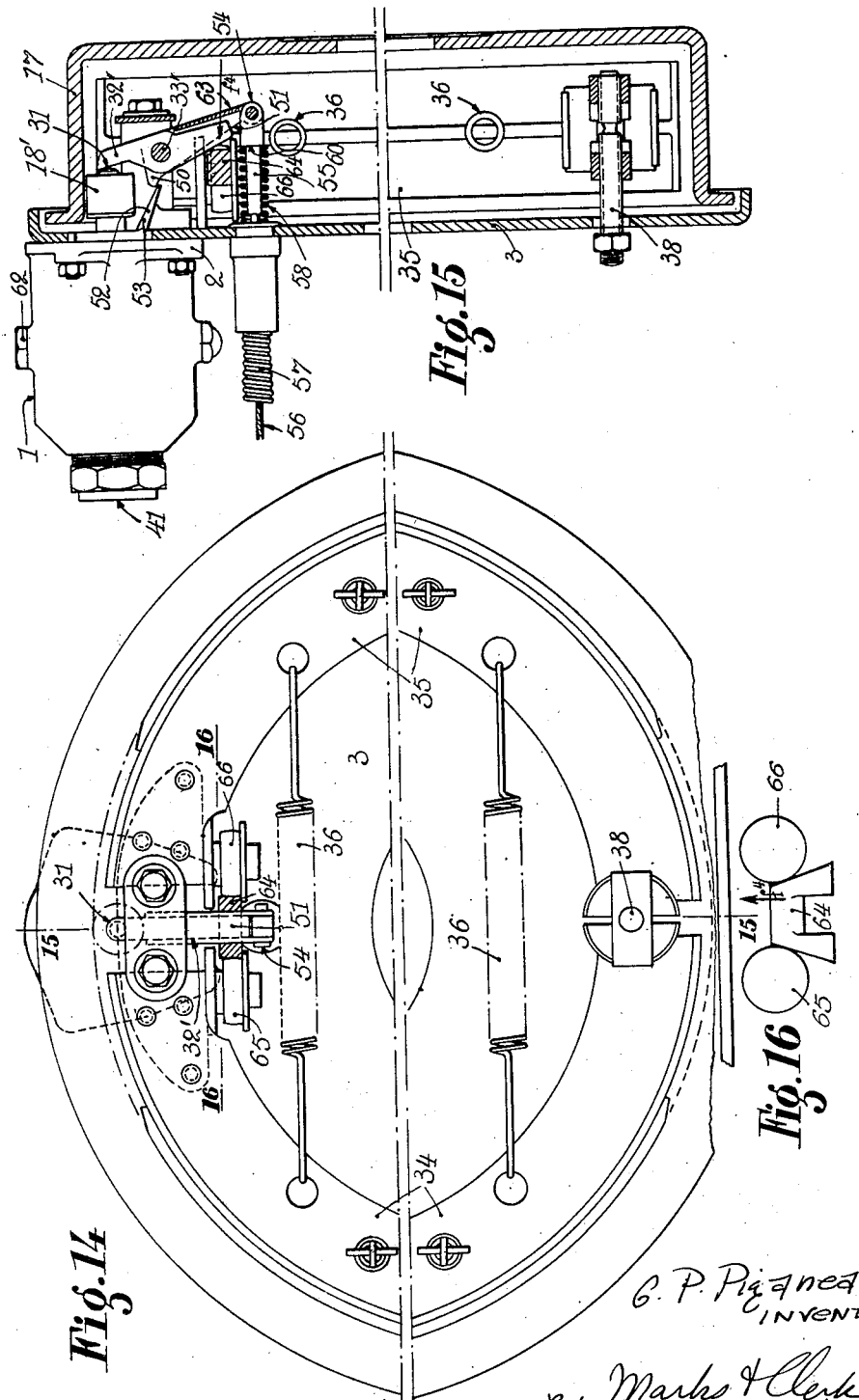

Patented July 23, 1935

2,009,275

UNITED STATES PATENT OFFICE 2,009,275

SERVO-BRAKE

Gérard Pierre Piganeau, Paris, France

Application August 3, 1933, Serial No. 683,519
In France August 25, 1932

12 Claims. (Cl. 188—140)

The present invention has for its object an improved servo-brake, of the type employing centrifugal force, for the wheels of aeroplanes and of motor vehicles, for pulleys, fly-wheels, etc.

This servo-brake is chiefly characterized by the fact that it is mounted directly upon the supporting disc of the brake (or an analogous piece), the setting in rotation of the parts subjected to the centrifugal force being assured directly by the wheel, or like rotary part, to be braked, and thus there will be an automatic regulating of the braking.

The rotary tube or other part actuating the heavy masses subjected to the action of the centrifugal force, carries for example a collar or analogous member, which is operated by friction by the wheel, fly-wheel or pulley to be braked.

According to another characteristic, the mechanism comprises an automatic uncoupling device.

According to one form of construction, the mechanism is contained in a cylinder, mounted in the eccentric position in a casing secured to the disc supporting the brake or analogous part, the eccentricity being adjustable by a controlling device, which permits the mechanism to take such positions that the collar or analogous member will make friction contact, or not, with the wheel, pulley or fly-wheel to be braked.

According to another feature of the invention, an auxiliary element, subjected to the action of a controlling device of any kind, is mounted in the mechanism in such way as to permit the direct displacement, in the direction of the braking, of the element of the braking device upon which the mechanism is to act when the effect of the centrifugal force which should normally act upon the said element is insufficient by reason of the reduced speed of rotation of the said heavy masses.

According to one form of construction, the auxiliary element, which is subjected to the action of a controlling device, consists of a lever which is so arranged as to permit, by its pivoting movements, in the first place the coupling of the servo-brake, and then the direct action upon the braking device.

Further characteristics will be set forth in the following description.

In the accompanying drawings, which are given solely by way of example:

Fig. 1 is a longitudinal section of a mechanism according to the invention, which is represented in the idle position.

Fig. 2 is an end view, with parts broken away.

Fig. 3 is a section of the mechanism, analogous to that of Fig. 1, showing the position of the parts in the normal braking position.

Fig. 4 is an analogous section of the mechanism, in which the device for limiting the effort, which this mechanism comprises, has operated.

Fig. 5 shows the connection between the mechanism and the braking parts.

Fig. 6 is a front view of the entire braking mechanism.

Fig. 7 is a longitudinal section of another embodiment of servo-brake in conformity with the invention, which is represented in the idle position.

Fig. 8 is a corresponding end view.

Figs. 9 and 10 are analogous views of the servo-brake in the normal position of operating at slow speed.

Figs. 11 and 12 are analogous views of the servo-brake in the position corresponding to a high rate of rotation.

Fig. 13 is an analogous view showing the position for direct braking for a speed of rotation which is very small or is null.

Fig. 14 is a partial front view, showing the position of the servo-brake upon a braking device comprising brake-shoes and a drum.

Fig. 15 is a diametrical section on the line 15—15 of Fig. 14.

Fig. 16 is a partial plan view on the line 16—16 of Fig. 8.

According to the form of construction represented in Figs. 1 and 2, the mechanism comprises an outer cylindrical casing 1, which is secured for example by means of lugs 2 (Fig. 2) to the brake disc 3. In the interior of said casing whose longitudinal axis is X—X, is mounted, through the medium of two cylindrical bearings 4 and 5, a cylinder 6. This cylinder 6, whose axis is Y—Y, is eccentric with reference to the bearings 4 and 5, that is, with reference to the casing 1. The eccentricity $e$ of the axes X—X and Y—Y is constant, but its direction can be changed at will by the rotation of the cylinder 6 and of its bearings 4 and 5 in the casing 1. The cylinder 6 is preferably provided with a groove 6ª.

The cylinder 6 is normally maintained in the position of Figs. 1 and 2, that is, the axis Y—Y for example in the vertical plane containing the axis X—X, by a helical spring 7 whereof one end 8 is secured to the disc 3 and the other end 9 is secured to the cylinder 6.

The rotation of the cylinder 6, against the action of the spring 7, is effected by means of a cable 10 wound upon a circular plate secured to the cylinder 6, to which its end is attached.

This cable 10, which ends at its other extremity in a controlling device, lever, pedal or the like, is contained in a flexible sheath 11 (Fig. 2). Preferably, the end of said sheath 11 bears, as herein represented, through the medium of a socket 12, upon a spring 13, adapted to limit the effort of traction exerted upon the cable 10 and to permit the operating collar to conform, in an elastic manner, to the possible deformations of the brake pulley. The other end of said sheath is not shown and is held stationary. When at rest, the spring 13 is expanded and the socket 12 is in its farthest position from the casing 1, and the sheath 11 has a sufficient length to extend along a curved path between its ends, together with the cable 10 guided in said sheath.

On the axis Y—Y, in the cylinder 6, is centered by means of ball bearings 14—15, a tube 16. To this tube 16 is securely fixed, opposite the brake drum 17, and in the interior of this drum, a friction collar whose diameter is such that it is not in contact with the rim of the drum 17 when the axis Y—Y of the cylinder 6 is at $Y^1$ (Fig. 2), said cylinder 6 being held back by the torsion spring 7.

The friction collar consists for example of a ring 18 of yielding material which is held by its lateral conical surfaces between two washers 19 and 20 of elastic material. The pressure is obtained by means of a nut 21. Preferably, a positive connection between the ring 18 and the tube 16 is assured by a small stud 22 which is loose in its recess in order to offer no prejudice to the elasticity of the ring.

The tube 16 comprises, in a known manner, two longitudinal apertures 23 and $23^a$ which are diametrically opposite, and in which are slidable two wedge-shaped members 24 and 25. These members 24 and 25 are held in contact, by a spring 26, with the inclined faces 27—$27^a$ and 28—$28^a$ of two members 29 and $29^a$ having the shape of a Y. The two branches forming the fork of each of these members 29—$29^a$ serve as a guide for a heavy mass 30—$30^a$, secured to the end of the central branch of the other member. One of these central branches is preferably terminated by a stud $6^b$ which is adapted to engage a recess $6^a$ of the cylinder 6, at the end of the movement.

As will be observed by comparing Figs. 1 and 3, the separation of the masses 30 and $30^a$ from the axis Y—Y is manifested by an increase $x^1-x$ of the distance between the ridges formed by the intersection of the surfaces 27—$27^a$ and 28—$28^a$.

The wedge 25 bears against a rod 31, whose end, which projects at the right from the tube 16, operates a cam-lever 32 in the direction of the arrow $f^3$, in the case of the brake herein represented. This lever 32, pivoting at 33 (Figs. 5 and 6) bears upon the brake-shoe 34, and is brought against the rod 31 by the reaction springs 36, which tend to bring together the two brake-shoes 34 and 35, due to the pivoting, on the one hand, of the shoe 36 on the fixed axle 37 mounted on the disc 3 of the wheel, and on the other hand, of the shoe 34 on its axle 38 connecting it with the shoe 35.

The other wedge 24 bears in like manner, by means of an appendage 39 slidable in the tube 16 against a member 40 slidable in a plug 41 screwed into the casing 1 and held in place by a suitable catch 42. The sliding member 40 bears against a spring 43 having a given force. This spring member 40 bears against the plug 41.

The sliding member 40 is provided with an appendage 44 which projects from the plug 41 and ends in a threaded part upon which are screwed a nut 45 and a lock-nut 46, by which the parts are secured after adjustment.

The operation is as follows. In the idle position, the axis Y—Y of the cylinder 6 is at $Y^1$ (Fig. 2), as this cylinder 6 is brought back by the spring 7; the collar or ring 18 is thus separated from the rim of the drum 17. As the tube 16 is not moved, the masses 30 and $30^a$ are brought towards the axis Y—Y (Fig. 1) by the wedges 24 and 25 which are subjected to the action of the springs 26 and 43 and of the reaction springs 36 of the brake shoes, acting upon the rod 31. The lever 32 is thus in its idle position, and the brake shoes 34 and 35 are brought back by their springs 36.

When it is desired to employ the brake, one acts in the known manner on the pedal or on the brake lever, which controls the cable 10.

By means of the cable 10, one thus acts upon the cylinder 6 in the direction of the arrow $f^4$ (Fig. 2), the brake drum 17 being supposed to rotate in the contrary direction to said arrow $f^4$. The position of the axis Y—Y separates from the position $Y^1$ (Fig. 2) and describes a portion of the circumference C, in such manner that the collar or ring 18 will come near the rim of the brake drum 17. For a sufficient traction upon the cable 10, this traction being limited by the spring 12, the ring 18 will bear upon the rim 17 with a sufficient pressure to be set in rotation by this rim in the contrary direction to the arrow $f^4$.

When the ring 18 is set in rotation, the tube 16 is also moved, as well as the blocks 30 and $30^a$. These latter move apart under the action of a centrifugal force F which increases with the speed of rotation. There will result two equal and opposite forces $F^1$ and $F^2$ in the direction Y—Y, which act respectively upon the rods 31 and 39 in the direction of the arrows $f^1$ and $f^2$ (Fig. 1). The force $F^2$ is counterbalanced by the resistance R of the spring 43, up to a value N of the speed of rotation of the masses 30—$30^a$ after which $F^2=R$ The spring 43 thus serves as a power-limiting device, and also as a shock-absorber, when the ring 18 is set in rotation by the brake drum 17. As to the force $F^1$, which is always equal to $F^2$, this moves the lever 32 to the right by means of the rod 31, thus pressing the shoes 34 and 35 against the brake drum 17. This force $F^1$ increases up to the value R, which is selected at will, due to the choice of the spring 43 and of the tension which is adjustable by the initial compression given to the spring 43 by a suitable screwing of the nut 45 on the rod 44, and of the lock-nut 46, after the adjustment.

When the opposing forces $F^1$ and $F^2$ have become equal to R, which corresponds to a speed N of the masses 30—$30^a$, the mechanism is in the position shown in Fig. 3. The said masses are now at a certain distance from the axis Y—Y; the appendage 39 has not as yet been moved to the left, the force $F^2$ being counterbalanced by the resistance R of the spring 43.

When the speed of rotation of the masses exceeds the value N, the forces $F^1$ and $F^2$ become slightly greater than R, and the spring 43 yields (Fig. 4) in such manner that the braking effort cannot be greater than R.

When the spring 43 (which serves to limit the power) yields to such degree as to allow a contact between the masses 30—$30^a$ and the cylinder 6, the friction of said masses upon the internal wall of the cylinder will tend to cause the slipping of the ring 18 upon the brake drum. If the adhesion between the ring 18 and the drum 17 on the one hand, and between the cylinder 6 and the masses 30—30ᵃ on the other hand, is sufficient, the said masses, which are set in rotation by the ring 18, will in turn rotate the cylinder 6 in the contrary direction to the arrow $f^4$ (Fig. 2), thus causing the separation of the ring 18 from the brake drum 17, and in consequence the automatic uncoupling.

Such adhesion between the masses 30—30ᵃ and the cylinder 6 is obtained by means of the stud 6ᵇ, which engages in the recess 6ᵃ of the cylinder 6.

During said automatic uncoupling, if the driver's pull on cable 10 is maintained, said cable 10 will be subjected to an increased tension, which reacts on the sheath 11, in such manner that said sheath becomes less curved and pushes the socket 12 towards the casing 1 while compressing the spring 13. The cable 10 guided in said sheath 11 becomes also less curved and is so adapted to follow the angular displacement of the cylinder 6.

As the ring 18 is no longer moved by the brake drum 17, the masses 30—30ᵃ are no longer subjected to centrifugal force, and will move towards the axis Y—Y under the action of the springs 26, 43 and 36. The stud 6ᵇ thus leaves the recess 6ᵃ, hence releasing the cylinder 6, which, owing to the effort of traction which is still exerted upon the cable 10, will again rotate in the direction of the arrow $f^4$ (Fig. 1), thus placing the ring 18 in contact with the brake drum 17. The braking is again effected, as above described.

In consequence, there will be produced, in the case above considered, in which the power set up by the centrifugal force much exceeds the resistance of the spring 43, a succession of automatic couplings and uncouplings between the collar or ring 18 and the brake drum 17, and hence an automatic regulating of the braking. Furthermore, this will prevent all slipping of the ring 18 on the brake drum 17, by which it might be damaged.

It is to be noted that by the position of the plug 41 which may be screwed at will, it is possible to adjust the mechanism in order to take up the longitudinal play due to the wear of the brake, whatever be the value R of the resistance of the spring 43, this resistance being regulated by the nut 45 and the securing lock-nut 46.

In the form of construction represented in Figures 7 to 16, the mechanism comprises also an external cylindrical casing 1 which is secured for instance by means of lugs 2 to the brake plate 3. In the interior of said casing 1 whose longitudinal axis is X—X, there is mounted a cylinder 6 adapted to pivot about two studs 4' and 5' (Figs. 8 and 7) carried by the casing 1 at one side of the center of said casing.

The cylinder 6 is normally maintained in the position shown in Figs. 7 and 8, in which its axis Y—Y is at the distance e from the axis X—X, by the end or point 50 of a lever 51 co-operating with the ramp 52 of an arm 53 carried by the cylinder 6.

The lever 51 is mounted in such manner as to pivot about an axle 33' and is pivoted at 54 to a rod 55 to which is attached a cable 56 contained in a sheath 57, leading for example to the pedal or lever of the brake.

A spring 58 interposed between a stop 59 and a shoulder 60 on the rod 55, tends to turn the lever 51 in the direction of the arrow $f^1$ (Fig. 7), for which the said lever holds the arm 53 and hence the cylinder 6.

On the other hand, the cylinder 6, when released from the point 50, tends to pivot about the studs 4'—5' in the direction of the arrow $f^2$ (Fig. 8) by the action of a suitable elastic device, for instance by a spring 61 adapted to exert its action radially.

A screw 62 screwing into the casing 1, permits, if desired, to hold the cylinder 6 in the position shown in Fig. 7, even if this cylinder is released from the locking lever 51. It is simply necessary, for this purpose, to screw down the screw 62.

In the same way as in the example of Figs. 1 to 6, a tube 16' is centered in the cylinder 6 on the axis Y—Y through the medium of a ball-bearing 14' and a smooth bearing 15'. Upon this tube 16' are mounted, as in the preceding example, a friction collar or ring 18' adapted to cooperate with the brake drum 17 and two wedge-shaped members 24 and 25 slidable in two longitudinal apertures 83 and 83ᵃ provided in the tube 16' and held in contact by a spring 26' with two Y-shaped members 29 and 29ᵃ serving as guides for heavy masses 30—30ᵃ.

The wedge 25 bears against a rod 31, whose end extends from the right-hand end of the tube 16, and operates, in the direction of the arrow $f^3$ (Fig. 7) and in the case of the brake herein represented, a lever 32', which lever 32' is pivoted at 33' to the same axle as the locking lever 51. The locking-lever 51 is provided with a flange 63 which is so disposed as to make contact with the lever 32' at a point below the axle 33' after a given rotation in the direction of the arrow $f^3$ (compare Figs. 7 and 13).

The lever 32' acts upon a wedge 64 (Figs. 14 to 16) located between rollers 65 and 66 mounted on the brake shoes 34 and 35, which are urged by reaction springs 36 tending to bring them towards one another by pivoting on the pivot 38. The wedge 64, when it is displaced in the direction of the arrow $f^4$ (Figs. 15 and 16), tends to separate the rollers 65—66, and hence the shoes 34—35, and to apply them against the brake drum 17.

The oppositely-situated plate 24 bears by means of a rod 39 (Figs. 7—9—11) slidable in the bearing 15, against a member 40 forming a slide in a plug 41, screwed into a member 41ᵃ which is in turn screwed into the casing 1 and is held by any suitable locking device 42. The slide 40 bears against an elastic system of a given force, consisting of several springs 43 and 43ᵃ. The springs 43 and 43ᵃ, which are coaxial, bear at their other ends against the plug 41.

The operation is analogous to that of the example shown in Figs. 1 to 6. In the idle position, the axis Y—Y of the cylinder 6 is at Y¹ (Fig. 8), as this cylinder 6 is maintained by the locking lever 51 which is drawn back by the spring 58 whose action is greater than that of the spring 61, and thus the collar or ring 18' is separated from the rim of the drum 17. As the tube 16' is not moved, the masses 30 and 30ᵃ are brought towards the axis Y—Y (Fig. 7) by the wedges 24 and 25 which are subjected to the action of the springs 26 and 43—43ᵃ. The lever 32' is thus in the idle position, and the brake shoes 34 and 35 are brought back by their springs 36.

When it is desired to apply the brakes, one acts in the usual manner upon the pedal or the lever of the brake.

Under the action of the cable 56, the lever 51 pivots in the contrary direction to the arrow $f^1$ (Fig. 7), thus compressing the spring 58, and the pointed end 50 moves upwardly (Fig. 9) thus releasing the arm 53 and hence the cylinder 6.

By the action of the spring 61, the cylinder will turn upon its studs 4'—5' in the direction of the arrow $f^2$ (Fig. 8).

The position of the axis Y—Y separates, in the upward direction, from the position $Y^1$, in such manner that the collar or ring 18' will move towards the rim of the brake drum 17. For a sufficient traction of the cable 56, the ring 18' will rub against the rim 17 with a sufficient pressure to be set in rotation by the said rim (in the direction of the arrows $f^5$ and $f^6$).

When the ring 18' is set in rotation, the tube 16' is also rotated, as well as the masses 30 and $30^a$. In like manner as in the example of Figs. 1 to 6, these masses produce two equal and opposite forces $F^1$ and $F^2$ in the direction Y—Y which act respectively upon the rods 31 and 39 (Fig. 9). The rod 31 displaces the lever 32' to the right thus pressing the shoes 34 and 35 against the brake drum 17. The springs 43—$43^a$ thus serve, in the same way as in the preceding example, as power-limiting devices, and also as a shock-absorber when the ring 18' is set in rotation by the brake drum 17.

When, due to the increasing speed of rotation of the masses, the forces $F^1$ and $F^2$ become slightly greater than the force R of the springs 43—$43^a$, these latter yield so as to permit the contact between the masses 30—$30^a$ and the cylinder 6, and in the same way as in the example of Figs. 1 to 6, the said masses, which are set in rotation by the said ring 18', will in turn cause the cylinder 6 to turn about the studs 4'—5' in the contrary direction to the arrow $f^2$ (Fig. 8). This movement of the cylinder 6 is due to the fact that the frictional action of the masses 30—$30^a$ on the cylinder 6 is exerted with relation to the studs 4'—5' with a greater lever on the right side of the cylinder 6 (Fig. 8) than on the left side of said cylinder, and consequently the action on the right side is predominant and tends to cause the separation of the ring 18' from the brake drum 17, and hence the automatic uncoupling.

In the same manner as in the example of Figs. 1 to 6, when the power set up by the centrifugal force considerably exceeds the resistance of the spring 43, a succession of automatic couplings and uncouplings is produced between the ring 18' and the brake drum 17, and hence an automatic limitation of the braking. On the other hand, this will reduce the slipping of the ring 18' on the brake drum 17, which might damage the same.

When it is desired to release the brakes, the operator ceases the drawing action on the cable 56, and the spring 58, whose action is greater than that of the spring 61, returns the rod 55 towards the right (Fig. 9), whereby the lever 51 pivots from the position shown in Fig. 9 to the position shown in Fig. 7, the end 50 of said lever engaging the arm 53 and causing the cylinder 6 to pivot downwards about the studs 4'—5' and consequently the tube 16' and the ring 18' to move away from the brake drum 17.

It is to be noted that by the position of the plug 41 which can be screwed at will, the mechanism can be regulated in such way as to take up the longitudinal play due to the wear of the brake, whatever be the value R of the resistance of the springs 43 and $43^a$, this resistance being regulated by the nuts 41—$41^a$.

Fig. 13 represents the apparatus at a rate of operation so much reduced that its action upon the brake cam 64 is null. The action of the driver has caused, by the first movement, the displacement of the lever 51 and the application of the ring 18' upon the brake drum 17. As the centrifugal servo-brake does not act, the driver's foot has continued its action. As the lever 51 makes contact at 63 with the lever 32' which is enabled to act directly upon the brake cam 64, this lever has been sufficiently displaced to assume the direct breaking without the aid of the servo-brake.

As concerns the lubrication, experience has shown that the oil placed in the cylinder 1 for the purpose of lubrication is subjected to a great pressure, due to the rotation of the heavy masses.

This pressure would tend to produce a resistance offering prejudice to the starting of the apparatus.

An arrangement is herein employed which permits the oil to escape from the cylinder 6 during the rotation of the heavy masses, and to return to the casing after each period of use.

According to the invention, one or more holes 70 are pierced in the cylinder 6, thus connecting the interior of the cylinder with the outer casing 1. Due to the pressure, the oil expelled through the hole or holes 70, and through several holes 72 pierced in the rear plate of the cylinder 6, will collect in the external casing 1.

A hole 71 (Figs. 7, 9, 11) pierced in the lower part of the cylinder 6, permits the oil collected in the external casing 1 to return to the cylinder 6, from which it will be again expelled when the movement of the heavy masses takes place, etc.

It should be noted that the return of the oil is facilitated by the tendency of the cylinder 6 to move, in the idle position, towards the lower part of the external casing 1 (uncoupling of the roller).

This will prevent the oil, under the influence of the pressure, from being expelled to the exterior of the cylinder 6 by the guides of the front and rear push-pieces. Through the rear push-piece, the oil would descend into the external casing 1, without being able to return, and through the front push-piece, the oil would circulate into the brake and would tend to flood the collar or ring 18'. These two drawbacks would be prejudicial to the braking. On the other hand, as the casing of the mechanism is emptied of oil after the action, the push-pieces, and especially the front piece, would tend to be wedged in place.

The discharge of oil through the push-pieces may be reduced to the sole amount required for the lubrication of these push-pieces. The regulating is in fact obtained by reason of the size and number of the discharge holes provided in the cylinder 6.

Obviously, the invention is by no means limited to the forms of construction herein represented and described, these being chosen solely by way of example.

Having now described my invention what I claim as new and desire to secure by Letters Patent is:

1. In a braking device in combination a rotatable member adapted to be braked, friction means adapted to be brought into and out of engagement with said rotatable member, a rotatable shaft, guiding means adapted to guide said shaft towards and away from said rotatable member, clutching means between said rotatable shaft and said rotatable member whereby said shaft is adapted to be rotated by said rotatable member when said shaft has been moved towards said rotatable member, a sliding member adapted to slide along said shaft, extensible and retractible centrifugal means adapted to be rotated by said shaft and operatively connected with said sliding member, whereby said sliding member is adapted to be moved along said shaft, and transmission means between said sliding member and said friction means, whereby said friction means are brought into and out of engagement with said rotatable member.

2. In a braking device, in combination a rotatable member adapted to be braked, friction means adapted to be brought into and out of engagement with said rotatable member, a rotatable shaft, guiding means adapted to guide said shaft towards and away from said rotatable member, a clutching collar secured on said shaft adapted to be brought by said shaft into and out of engagement with said rotatable member, whereby said shaft is adapted to be rotated by said rotatable member, a sliding member adapted to slide along said shaft, extensible and retractible centrifugal means adapted to be rotated by said shaft and operatively connected with said sliding member, whereby said sliding member is adapted to be moved along said shaft, and transmission means between said sliding member and said friction means, whereby said friction means are brought into and out of engagement with said rotatable member.

3. In a braking device, in combination a rotatable member adapted to be braked, friction means adapted to be brought into and out of engagement with said rotatable member, a rotatable shaft, guiding means adapted to guide said shaft towards and away from said rotatable member, an abutment on said shaft, two rings of elastic material mounted on said shaft, one of said rings bearing against said abutment, a clutching collar of yielding material inserted between said two rings and adapted to be brought by said shaft into and out of engagement with said rotatable member, whereby said shaft is adapted to be rotated by said rotatable member, a locking nut adapted to be screwed on said shaft and to press said clutching collar between said rings, a sliding member adapted to slide along said shaft, extensible and retractible centrifugal means adapted to be rotated by said shaft and operatively connected with said sliding member, whereby said sliding member is adapted to be moved along said shaft, and transmission means between said sliding member and said friction means, whereby said friction means are brought into and out of engagement with said rotatable member.

4. In a braking device, in combination a rotatable member adapted to be braked, a fixed support disposed opposite said rotatable member, friction means mounted on said support and adapted to be brought into and out of engagement with said rotatable member, a casing secured on said support, a cylinder eccentrically mounted in said casing and adapted to assume different eccentric positions, in said casing, a shaft rotatably mounted in said cylinder along the longitudinal axis of said cylinder, whereby said shaft is adapted to be moved by said cylinder towards and away from said rotatable member, control means adapted to bring said cylinder into said different positions, clutching means between said rotatable shaft and said rotatable member whereby said shaft is adapted to be rotated by said rotatable member, when said shaft has been moved towards said rotatable member, a sliding member adapted to slide along said shaft, extensible and retractible centrifugal means adapted to be rotated by said shaft and operatively connected with said sliding member, whereby said sliding member is adapted to be moved along said shaft, and transmission means between said sliding member and said friction means, whereby said friction means are brought into and out of engagement with said rotatable member.

5. In a braking device as claimed in claim 4, the further feature consisting in elastic means adapted to urge said cylinder in a position in which said shaft is in its extreme position away from said rotatable member.

6. In a braking device, in combination a rotatable member adapted to be braked, a fixed support disposed opposite said rotatable member, friction means mounted on said support and adapted to be brought into and out of engagement with said rotatable member, a casing secured on said support, a cylinder eccentrically mounted in said casing and adapted to assume different eccentric positions in said casing, a shaft rotatably mounted in said cylinder along the longitudinal axis of said cylinder, whereby said shaft is adapted to be moved by said cylinder towards and away from said rotatable member, elastic means adapted to urge said cylinder in a position in which said shaft is in its extreme position away from said rotatable member, a cable wound on the cylinder and adapted to be pulled and to bring said cylinder into said different eccentric positions against the action of said elastic means, clutching means between said rotatable shaft and said rotatable member whereby said shaft is adapted to be rotated by said rotatable member, when said shaft has been moved towards said rotatable member, a sliding member adapted to slide along said shaft, extensible and retractible centrifugal means adapted to be rotated by said shaft, and operatively connected with said sliding member, whereby said sliding member is adapted to be moved along said shaft, and transmission means between said sliding member and said friction means, whereby said friction means are brought into and out of engagement with said rotatable member.

7. In a braking device, in combination a rotatable member adapted to be braked, a fixed support disposed opposite said rotatable member, friction means mounted on said support and adapted to be brought into and out of engagement with said rotatable member, a casing secured on said support, a cylinder eccentrically mounted in said casing and adapted to assume different eccentric positions in said casing, a shaft rotatably mounted in said cylinder along the longitudinal axis of said cylinder, whereby said shaft is adapted to be moved by said cylinder towards and away from said rotatable member, control means adapted to bring said cylinder into said different positions, clutching means between said rotatable shaft and said rotatable member whereby said shaft is adapted to be rotated by said rotatable member, when said shaft has been moved towards said rotatable member, a sliding member adapted to slide along said shaft, extensible and retractible centrifugal means adapted to be rotated by said shaft and operatively connected with said sliding member, whereby said sliding member is adapted to be moved along said shaft, said centrifugal means being adapted to engage the inner wall of said cylinder when the speed of rotation of said shaft exceeds a determined value, whereby said cylinder is adapted to be moved by said centrifugal means so as to bring said shaft away from said rotatable member, and transmission means between said sliding member and said friction means, whereby said friction means are brought into and out of engagement with said rotatable member.

8. In a braking device, in combination a rotatable member, adapted to be braked, friction means adapted to be brought into and out of engagement with said rotatable member, a rotatable shaft, guiding means adapted to guide said shaft towards and away from said rotatable member, clutching means between said rotatable shaft and said rotatable member whereby said shaft is adapted to be rotated by said rotatable member when said shaft has been moved towards said rotatable member, two sliding members adapted to slide along said shaft, extensible and retractible centrifugal means adapted to be rotated by said shaft and operatively connected with said sliding members, whereby said sliding members are brought nearer or farther from each other according as the speed of said shaft is reduced or increased, transmission means, between one of said sliding members and said friction means, whereby said friction means are brought into and out of engagement with said rotatable member, an adjustable cap, a plate movable in said cap and on which the other of said sliding members is adapted to bear, yielding means bearing on said plate, and adjustable means on said cap adapted to adjust the tension of said yielding means.

9. In a braking device, in combination a rotatable member adapted to be braked, friction means adapted to be brought into and out of engagement with said rotatable member, an actuating member adapted to bring said friction means into engagement with said rotatable member, a rotatable shaft, guiding means adapted to guide said shaft towards and away from said rotatable member, clutching means between said rotatable shaft and said rotatable member whereby said shaft is adapted to be rotated by said rotatable member when said shaft has been moved towards said rotatable member, a sliding member adapted to slide along said shaft, extensible and retractible centrifugal means adapted to be rotated by said shaft and operatively connected with said sliding member whereby said sliding member is adapted to be moved along said shaft, transmission means between said sliding member and said actuating member, whereby said friction means are brought into and out of engagement with said rotatable member, a lever adapted to move said actuating member independently of said sliding member, and means for controlling said lever.

10. In a braking device, in combination a rotatable member adapted to be braked, friction means adapted to be brought into and out of engagement with said rotatable member, an actuating member adapted to bring said friction means into engagement with said rotatable member, a rotatable shaft, guiding means adapted to guide said shaft towards and away from said rotatable member, clutching means between said rotatable shaft and said rotatable member whereby said shaft is adapted to be rotated by said rotatable member when said shaft has been moved towards said rotatable member, a sliding member adapted to slide along said shaft, extensible and retractible centrifugal means adapted to be rotated by said shaft and operatively connected with said sliding member, whereby said sliding member is adapted to be moved along said shaft, a first pivoting lever bearing on one side on said sliding member and on the other side on said actuating member, whereby said friction means are brought into and out of engagement with said rotatable member, a second pivoting lever adapted to be brought into and out of engagement with said first pivoting lever, yielding means adapted to urge said second lever out of engagement with said first pivoting lever, and control means adapted to bring said second lever into engagement with said first pivoting lever.

11. In a braking device, in combination a rotatable member adapted to be braked, a fixed support disposed opposite said rotatable member, friction means mounted on said support and adapted to be brought into and out of engagement with said rotatable member, an actuating member adapted to bring said friction means into engagement with said rotatable member, a casing secured on said support, a cylinder eccentrically mounted in said casing provided with a stop piece and adapted to assume different eccentric positions in said casing, a shaft rotatably mounted in said cylinder along the longitudinal axis of said cylinder, whereby said shaft is adapted to be moved by said cylinder towards and away from said rotatable member, clutching means between said rotatable shaft and said rotatable member whereby said shaft is adapted to be rotated by said rotatable member when said shaft has been moved towards said rotatable member, a sliding member adapted to slide along said shaft, extensible and retractible centrifugal means adapted to be rotated by said shaft and operatively connected with said sliding member, whereby said sliding member is adapted to be moved along said shaft, a first pivoting lever bearing on one side on said sliding member, and on the other side on said actuating member, whereby said friction means are brought into and out of engagement with said rotatable member, elastic means adapted to urge said cylinder in a position in which said shaft is in its extreme position near said rotatable member, a second pivoting lever adapted to normally engage said stop piece on said cylinder and to maintain said cylinder in a position in which said shaft is in its extreme position away from said rotatable member, said second pivoting lever being also adapted to be brought into and out of engagement with said first pivoting lever, yielding means adapted to urge said second lever into engagement with said stop piece and out of engagement with said first pivoting lever, and control means adapted to bring said second lever firstly out of engagement with said stop piece and secondly into engagement with said first pivoting lever.

12. In a braking device, in combination a rotatable member adapted to be braked, a fixed support disposed opposite said rotatable member, friction means mounted on said support and adapted to be brought into and out of engagement with said rotatable member, a casing secured on said support, a cylinder eccentrically mounted in said casing and adapted to assume different eccentric positions in said casing, said cylinder being provided with holes in its substantially horizontal diametrical plane and with holes at its lower part, a shaft rotatably mounted in said cylinder along the longitudinal axis of said cylinder, whereby said shaft is adapted to be moved by said cylinder towards and away from said rotatable member, control means adapted to bring said cylinder into said different positions, clutching means between said rotatable shaft and said rotatable member whereby said shaft is adapted to be rotated by said rotatable member, when said shaft has been moved towards said rotatable member, a sliding member adapted to slide along said shaft, extensible and retractible centrifugal means adapted to be rotated by said shaft and operatively connected with said sliding member, whereby said sliding member is adapted to be moved along said shaft, and transmission means between said sliding member and said friction means, whereby said friction means are brought into and out of engagement with said rotatable member.

GÉRARD PIERRE PIGANEAU.